(12) United States Patent
Catellani et al.

(10) Patent No.: US 6,680,597 B1
(45) Date of Patent: Jan. 20, 2004

(54) METHOD FOR SETTING A POLYPHASE ELECTRIC STEPPER MOTOR

(75) Inventors: Didier Catellani, Porrentruy (CH); Daniel Prudham, Thise (FR)

(73) Assignee: Societe Industrielle de Soncez, S.A., Sonceboz (CH)

(*) Notice: Subject to any disclaimer, the term of this patent is extended or adjusted under 35 U.S.C. 154(b) by 55 days.

(21) Appl. No.: 10/018,880

(22) PCT Filed: Jun. 14, 2000

(86) PCT No.: PCT/FR00/01645
§ 371 (c)(1),
(2), (4) Date: Mar. 4, 2002

(87) PCT Pub. No.: WO01/01558
PCT Pub. Date: Jan. 4, 2001

(30) Foreign Application Priority Data

Jun. 29, 1999 (FR) .............................................. 99 08436
Jul. 27, 1999 (FR) .............................................. 99 09828

(51) Int. Cl.$^7$ .............................. H02P 8/08; G01P 3/46
(52) U.S. Cl. ......................... 318/696; 318/15; 318/459
(58) Field of Search .............................. 318/9, 14, 15, 318/490, 626, 652, 459, 500, 685, 696; 388/928.1

(56) References Cited

U.S. PATENT DOCUMENTS

| | | | | |
|---|---|---|---|---|
| 3,581,182 A | * | 5/1971 | Comstock et al. | 318/685 |
| 3,866,216 A | * | 2/1975 | Tschumi | 377/90 |
| 4,302,712 A | * | 11/1981 | Pritchard | 318/490 |
| 4,314,146 A | * | 2/1982 | Berney | 377/112 |
| 5,877,694 A | * | 3/1999 | Kataoka | 340/688 |

FOREIGN PATENT DOCUMENTS

| | | |
|---|---|---|
| DE | 42 00 551 | 7/1993 |
| EP | 0 833 438 | 1/1998 |

* cited by examiner

Primary Examiner—Bentsu Ro
(74) Attorney, Agent, or Firm—Harrison & Egbert

(57) ABSTRACT

A method for setting an electric motor, which includes, during a non-powering sequence of at least one of the motor phases, measuring on a predetermined time window, the induced voltage (Ti) in the non-powered phase and in comparing its mean value to a threshold value (Ts) to stop powering of the motor on the current sequence if the measured mean value is less than the threshold value.

8 Claims, 2 Drawing Sheets

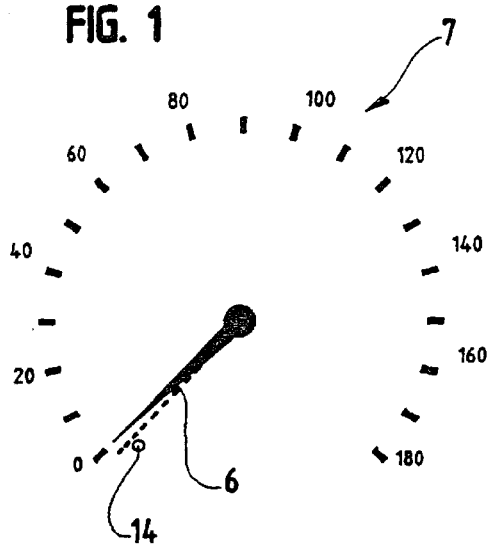
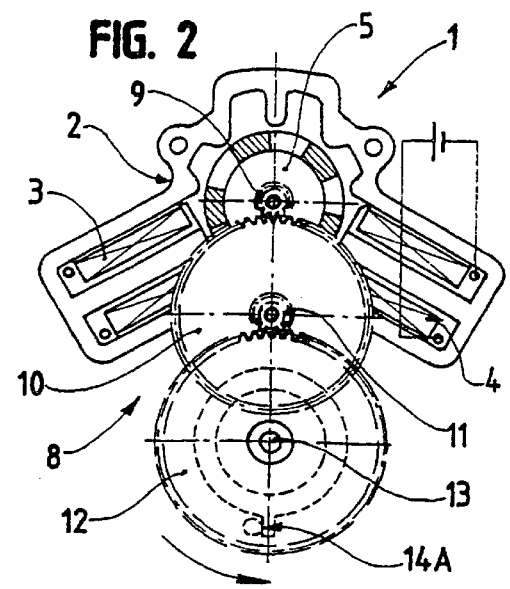
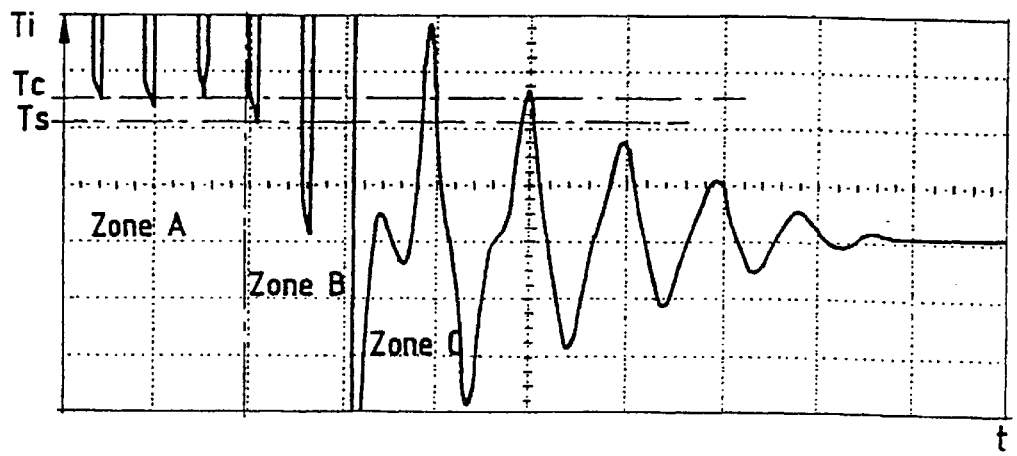
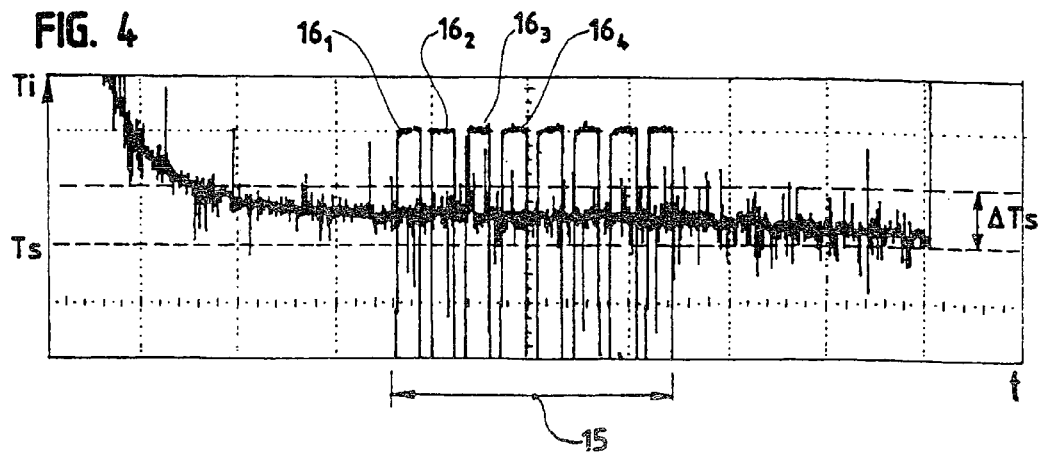

METHOD FOR SETTING A POLYPHASE ELECTRIC STEPPER MOTOR

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The invention relates to a method for setting an electric motor with respect to a reference position corresponding to a mechanical stop transmitted, through a reduction gear, to said electric multi-phase motor with sequential power supply for step-by-step operation.

BACKGROUND OF THE INVENTION

The peculiarity of a stepper motor is that it ensures a continuous incremental mechanical motion. That is why they are often used in measuring systems for carrying out indicating functions. As a typical application, one should note the control of pointers of measuring or indicating instruments, such as the instruments of a dashboard of a motor vehicle or the control of shutters for adjusting the air flow in an air-conditioning circuit.

In a stepper motor, to each power-supply impulse corresponds a constant elemental rotation by one step. A determined number of impulses results into a corresponding number of steps and, hence, into a known rotation of the rotor. The succession of impulses at a determined frequency allows imparting an almost constant speed of rotation.

In fact the stepper motor is often associated with a gear system that acts as a reduction gear in order to mechanically reduce the amplitude of the angular pitch at the level of the load, for instance a pointer. In that way, the resolution is increased.

In an indicating system with a sufficiently good resolution, one cannot see the incremental nature of the motor's rotation, which gives the impression of a continuous motion at the level of the pointer.

FR-95.15436 and FR-96.12765 or also EP-A-587,685 already now disclose such multi-phase rotary stepper motors, namely for controlling a pointer of an indicating device.

In this respect one understands that it is important in this field of application to have a good matching between the pointer's position and the graduation of the dial in front of which the latter has to move. One of the difficulties experienced at the putting into operation of an apparatus of this kind is the location of the pointer with respect to a reference position, in particular when there is no indication about the initial position of the pointer or also when an offset has occurred due to a failure during the pause phase that has resulted in a loss of information. The system must then be re-initialized, in order to cause the pointer to start again from a known position.

It is therefore necessary to fix a reference position likely to define the angular origin of the rotor, so that by counting the number of steps performed, starting from the reference position, thus the number of impulses applied to the motor, it is possible to know the angular position of the rotor with respect to this reference. Of course, knowing the characteristics of the reduction gear, it is possible to derive from it the position of the controlled pointer, even of a shutter, except for the backlash of the gear.

Since in a large number of applications regarding an indicating device with a pointer, the latter must rotate according to a travel path of less than 3601, even of less than 3001, the reference position can be defined by a mechanical stop located either at the level of the dial in front of which said pointer moves or also at the level of the gear system, so as to limit the angular travel distance of the tooth-wheels the latter is comprised of. In the case of a reduction gear, the internal mechanical stop is usually located on the end wheel, i.e. the one the axis of which controls the load, hence, the pointer.

Therefore, to proceed to this initialization of the system, one controls the power supply to the motor, so that its rotor controls the rotation of the load towards the mechanical stop. Once the latter has been detected and knowing the angle between this mechanical stop and the zero value of the dial, one applies the number of steps required in order to bring the pointer to this zero value. Likewise, during the operation of the indicating system, it is possible to transmit to the motor the power-supply sequences or impulses resulting into a determined number of steps, in order to impart to the pointer the necessary angular position along the indicating dial.

Once more, it should be clearly stated that, though the state of technique described in particular for setting forth the problem that arises is that related to the indicating devices with a pointer, the present invention is in no way limited, since it will also find an application for other devices such as the devices for controlling the shutters of air-conditioning circuits for motor vehicles. Thus, the invention will be of interest whenever it is necessary, despite an operation in open circuit and, hence, in the absence of sensors, to know the accurate position of a load driven by a stepper motor, in particular through a reduction gear.

Finally, this re-initialization of the indicating system has to be performed at each putting into operation, which means that the reference position is searched for at each switching-on.

In this respect EP-A-0,551,562 discloses a method for setting a multi-phase electric stepper motor with respect to a mechanical stop. This method is based on the principle that from the action of the rotation of the rotor including N pairs of poles results an induced voltage in the phases corresponding to the coiling of the stator. When the rotor stops rotating, this voltage is obviously canceled.

Therefore, this previously known method merely consists in detecting the zero crossing of the voltage induced into at least one of the phases of the motor, in order to know the reference position.

This kind of method has a number of drawbacks. In particular, in the case of an indicating system, the kick back of the pointer cannot be avoided and will lead to an error in the position of the latter and, hence, to a poor indicating accuracy.

In addition, for reasons of reliability of the method, it is common practice to feed the motor in a reverse direction of rotation with respect to the mechanical stop, before causing it to reverse the direction to finally detect this mechanical stop through measuring an induced voltage equal to zero. In the case of an indicating device, this movement of the pointer without any apparent reason to the user has to be avoided.

Since this induced voltage is measured at the level of one phase of the motor during a sequence in which said phase is not fed, it is absolutely necessary to monitor d-ds zero crossing of the induced voltage on each phase of the motor if one wants to accurately detect, to within one step, the reference position corresponding to said mechanical stop.

Obviously, such a reference position could be detected by any other means, namely through an optical sensor capable of detecting the crossing of the pointer of a shutter or the like. Such solutions are however cumbersome and expensive.

BRIEF SUMMARY OF THE INVENTION

The present invention is based on the fact established during a first inventive step, that the presence of the gear system, such as a reduction gear, beyond which is necessarily located the mechanical stop, is the reason for there existing a determined period of time between the moment at which the device meets this mechanical stop and that at which the motor stops, this transient state namely resulting from the mechanical backlash and the elasticity this kind of mounting exhibits. More exactly, when the end wheel of the reduction gear or the driven pointer arrives at the stop, the various wheels and tooth-wheels of this gear system are progressively blocked against each other with a determined stress, which results into a progressive increase of the load of the motor, in particular, a slowing down of the latter, which results into a change in the induced voltage in the phases of this motor from the value of this induced voltage during stabilized operation to zero. Therefore, the object of the present invention consists in a method the principle of which is, as a matter of fact based on the detection of this change of this induced voltage and/or of its crossing below a threshold value, this under well determined conditions, to instantaneously control the stoppage of the motor, i.e. even before this induced voltage is equal to zero.

Finally, by stopping the sequence of power supply to the motor as soon as possible, well before the induced voltage crosses the zero point, the gear is impeded from fully blocking, which would results into the kick back of the pointer or of the shutter on the mechanical stop and, hence, into a positioning error. One should note that since this transient phenomenon resulting from the transmission of the effect of the mechanical stop to the motor through the gear system occurs irrespective of whether the load is far from the reference position or is close to it, it is in any case possible to detect this transient state of the induced voltage in a phase of the motor and, through it the reference position searched for.

To this end, the invention relates to a method for setting an electric motor with respect to a reference position corresponding to a mechanical stop transmitted, through a gear system, namely a reduction gear, to said electric multi-phase motor with sequential power supply for step-by-step operation, characterized in that it consists in measuring in a determined time window, during a sequence of non-feeding of at least one of the phases of the motor, the induced voltage in the phase that is not fed and in comparing its average value with a threshold value, in order to stop the feeding of said motor on the sequence in progress if this average measured value is lower than said threshold value. One should note that the chosen threshold value should be chosen lower than the average value that is normally reached by this induced voltage at the speed that is imposed to the controlled load.

The invention also relates to a method for setting an electric motor with respect to a reference position corresponding to a mechanical stop transmitted, through a gear system, namely a reduction gear, to said electric multi-phase motor with sequential power supply for step-by-step operation, characterized in that it consists in reading in a determined time window, during a sequence of non-feeding of at least one of the phases of the motor, the change in the induced voltage in the phase that is not fed and in comparing that change with a standard change, in order to stop the feeding of said motor on the sequence in progress in the event of an offset.

The present invention will be better understood when reading the following description, with reference to the attached drawings related to embodiments given by way of examples.

BRIEF DESCRIPTION OF THE SEVERAL VIEWS OF THE DRAWINGS

FIG. 1 is a schematic view of the dial of an indicating device with a pointer and a mechanical stop located on the dial.

FIG. 2 is a schematic view of an exemplary embodiment of a stepper motor controlling a load through a gear system in the form of a reduction gear at the level of which a mechanical stop is provided for.

FIG. 3 is a diagrammatic illustration showing a graph of the evolution over the time of the induced voltage in a phase when a load, in particular a pointer, reaches a mechanical stop.

FIG. 4 is a diagrammatic illustration showing a graph of the measurement performed on the induced voltage in a phase during the zero feed sequence of the latter.

DETAILED DESCRIPTION OF THE INVENTION

Figure 5:
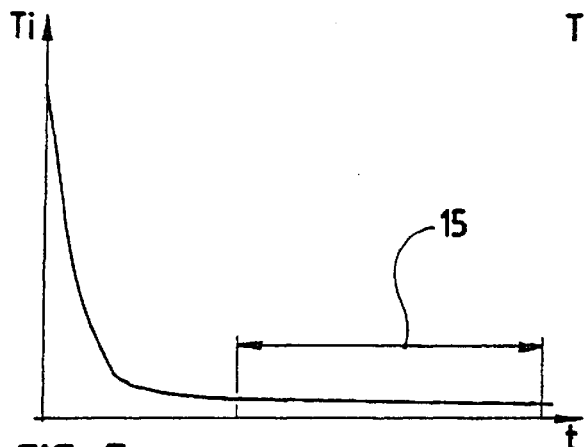
FIGS. 5 and 6 schematic views showing graphs similar to FIG. 4, but in a schematic form, FIG. 5 showing the evolution during a non-feed sequence of the induced voltage in the latter when the mechanical stop is not reached, and FIG. 6 showing this evolution of this induced voltage, under the same conditions, once the mechanical stop has been reached.

The present invention relates in particular to the field of the multi-phase electric motors an embodiment of Which is shown in FIG. 2, such a motor being sequentially fed for a known step-by-step operation. In particular, the motor 1 shown by way of an example in this FIG. 2 is of a two-phase type and includes a stator portion provided with two electric coils 3, 4 and inside which moves a rotor 5 having N pairs of poles, radially mounted in an alternate direction. Here, N is equal to 5.

Obviously, such a motor 1 can be fed in a M-step mode or a half-step mode, in a way known to the specialist. One should however note that the latter solution proves more advantageous, since the thus driven load adopts a substantially continuous motion.

As regards this driven load, it is formed, in an exemplary application of this motor to an indicating device, by a pointer 6 that has to move in front of a dial 7. This load could also be formed by a shutter within the framework of an application to the adjustment of the air flow of an air-conditioning circuit for motor vehicles, for example.

Anyway, this load, here the pointer 6, is controlled by the motor 1, through a gear system 8 in the form of a reduction gear. Thus, mounted on the rotor 5 is a rotor tooth-wheel 9 that acts on an intermediate wheel 10 mounted axially integral with an intermediate wheel 11, in turn, engaging with an end wheel 12 on the axis 13 of which the pointer 6 is mounted.

As a matter of fact in this type of application to indicating devices with pointer or to controls of shutters, said pointer 6 or such a shutter must rotate only according to a travel distance smaller than 3601, which allows using a mechanical stop 14, 14A arranged either outside the motor 1, for example on the dial 7, so as to co-operate with the pointer 6, as can be seen in FIG. 1, or inside this motor 1, and, in such case, the mechanical stop 14A acts on the gear system 8, in particular on the end wheel 12 subjected to a rotation by less than 3601.

Finally, the present invention relates to a method for setting, with respect to a reference position defined by such a mechanical stop 14, 14A, a multi-phase electric stepper motor 1, taking into consideration that the action of the mechanical stop 14, 14A occurs through the gear system 8.

In this respect, in FIG. 3 has been shown the signal of the induced voltage Ti measured in one phase of the motor 1, this when the pointer 6 or the end wheel 12 arrives against said mechanical stop 14, 14A.

In particular, as can be seen in the first portion, designated as zone A, of the graphic corresponding to a stabilized mode of operation of the motor 1 and that will be assimilated to a high-speed approach, d-ds induced voltage Ti in said phase taken into consideration, measured when the latter is not fed, reaches a substantially constant value Tc.

Beyond this zone A, in zone B corresponding to the case in which the pointer 6 or the gear system 8 reaches the mechanical stop 14 or 14A, respectively, this induced voltage Ti is not canceled suddenly, but through a transient state that progressively diminishes, to finally oscillate in zone C that corresponds, as occurs through known techniques, to the kick back of the pointer 6 or of said gear system 8 against said stop 14; 14A. Now, as a matter of fact one wants to avoid this phenomenon.

Therefore, the method according to the invention consists, as a matter of fact during a non-feeding sequence of at least one phase of the motor 1, in measuring, in a determined time window 15, the induced voltage Ti in said phase that is not fed and in comparing the average value of the latter with a threshold value Ts, in order to stop the feeding of said motor 1 on the sequence in progress if said average measured value Ti is lower than this threshold value Ts.

In this respect, this threshold value Ts will be chosen lower than the average value normally achieved by this induced voltage at the speed that is imposed to the controlled load.

FIG. 4 shows, on a non-feeding sequence of the phase on which the measurement performed, the induced voltage Ti in this phase. One can also see the window 15 during which several measurements 16, $16_1$, $16_2$, $16_3$, $16_4$ are performed, in order to obtain an average value that is then compared to a value Ts, which is the predefined threshold value.

One should note that, since the feed impulses for the motor are controlled over the time, it is easy to define the measuring windows 15 very accurately.

FIG. 5 is a very schematic view of FIG. 4 and shows in particular the evolution of the induced voltage Ti in a phase of the motor 1 during a non-feed sequence of said phase, this when the load, hence, the pointer 6 or also the gear system 8, has not reached the mechanical stop 14 or 14A, respectively. In comparison, in FIG. 6, one sees the evolution, under the same conditions, of this induced voltage Ti when, on the other hand, this mechanical stop 14; 14A has been reached. It appears that it is possible, in a measuring window 15 on one single non-feed sequence of the monitored phase, to detect a change Δti in the induced voltage in this phase, which change represents the fact that the pointer 6 or the gear system has arrived at the mechanical stop 14 or 14A, respectively. Thus, the setting method according to the invention also extends to the case in which one will not merely measure a value of the induced voltage Ti, but also read a change Δti in this induced voltage, in order to compare it to a standard change in a stabilized state, which, when it is exceeded, causes the power supply to said motor 1 on the sequence in progress to be stopped.

Figure 6:
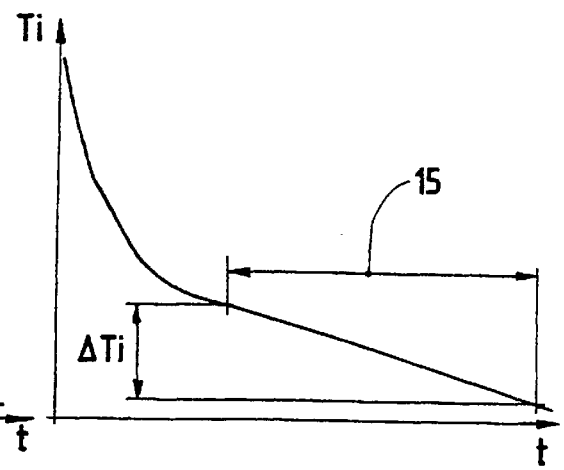
Figure 7:
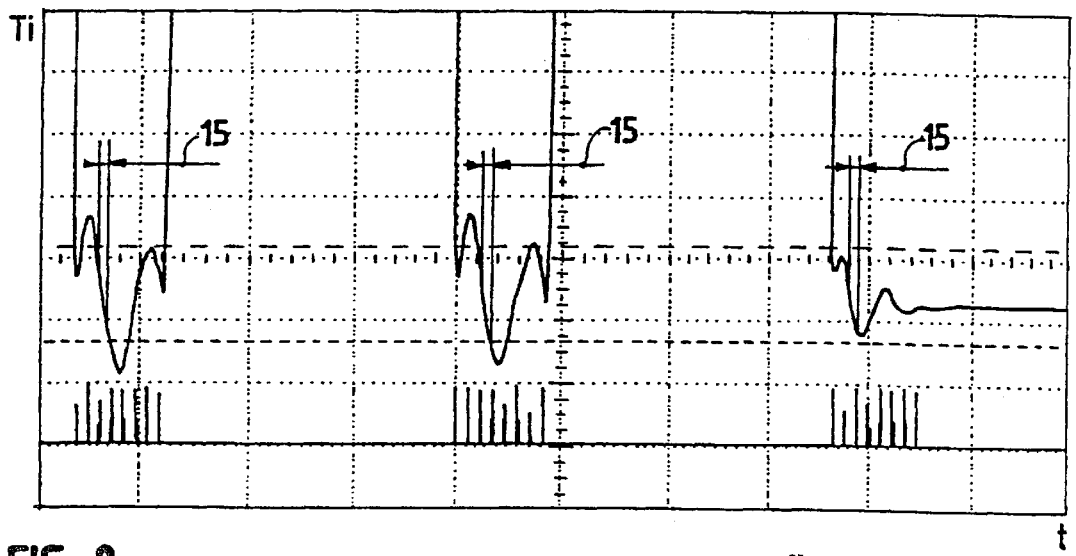
FIG. 7 is a diagrammatic illustration showing the evolution over the time of the induced voltage in a phase of the motor at a very low feed frequency.

When the graphs shown in FIGS. 4 to 6 correspond to the evolution of the induced voltage in a phase during a non-feed sequence of the latter, this when the motor operates at high speed, i.e. with a high feed frequency, FIG. 7 shows the same evolution of the induced voltage Ti in a phase when the motor is fed at a very low impulse frequency.

As can be seen, the undulation defined by this induced voltage Ti in the monitored phase during the non-feed sequences S1 and S2 of said phase adopts a very particular shape and amplitude. However, in sequence S3, which corresponds to the arrival of the pointer 6 or the gear system 8 against the mechanical stop 14 or 14A, respectively, this undulation changes, so that even in this case, one can detect in a well-defined measuring window 15, a change Δti in the induced voltage that when it is different from a standard change Δtis, causes the feeding of the motor during the sequence in progress to be stopped.

The method is obviously also effective when the pointer 6 or the gear system 8 is from the start up of the system already against the mechanical stop 14 or 14A, respectively. In fact in that case, one measures, during a non-feed sequence of a phase, an induced voltage in the latter substantially equal to zero, which, since it is lower than the predetermined threshold voltage Ts, causes the motor to be stopped on said sequence.

One understands from the preceding description that the setting method used can correspond to a combination of detection of the trespassing of a threshold value Ts or a change in the induced voltage Δti higher and/or lower than a predetermined change Δtis.

Hence, to proceed to setting the motor 1 with respect to the reference position corresponding to the mechanical stop 14; 14A upon switching on of the system, the motor 1 is preferably fed, during a first time, at a very low frequency towards the mechanical stop, this over a determined reduced number of steps beyond which, if the mechanical stop has not been detected, one proceeds to a high-speed approach. More exactly, the motor 1 is then fed at a high frequency, until the mechanical stop 14; 14A is met.

Like in the past, there can obviously be contemplated to use only the solution of the high-speed approach. Therefore, during the initialization phase and, hence, the phase of determining the reference position defined by the mechanical stop 14; 14A, the motor is first of all fed over several steps in the direction opposite to this mechanical stop 14; 14A, before being fed in the opposite direction and at high speed, for a quick arrival at said stop 14; 14A.

One should note that though the above-described methods consist in monitoring the induced voltage in only one phase of the motor when said phase is not fed, for a higher accuracy, there can also be contemplated to monitor the evolution of the induced voltage successively in each one of the phases when they are not fed.

However, in the particular case in which the mechanical stop 14A is inside the motor 1, in fact, installed on the gear system 8, it is possible to know, by design, the step of the motor to which corresponds the arrival of said gear system 8 against this mechanical stop 14A. Under such circumstances, it is enough to monitor the only phase that corresponds to this step of the motor during which said mechanical stop 14A acts.

FIG. 2 shows a gear system 8 mechanically set with respect to a mechanical stop 14A in a balanced position of the rotor 5. In fact the mechanical setting method that is applied here consists in bringing the rotor 5 into a balanced position through feeding one of its phases. Then, through the intermediate tooth-wheels is ensured that the end wheel 12 is into co-operation with said mechanical stop 14A.

More particularly and according to the invention, the number of teeth of the rotor tooth-wheel 9 is chosen to be equal to the number of poles of the rotor magnet or to a multiple of it. In FIG. 2, the number of teeth of the rotor tooth-wheel 9 is equal to the number of poles of the magnet, i.e. ten in motor 1 as shown.

As regards the number of teeth of the intermediate wheel 10, it corresponds to a multiple of the number of teeth of the intermediate tooth-wheel 11. However, because of problems of wear, the number of these teeth of the intermediate wheel 10 is preferably chosen so that it does not correspond to a multiple of the number of teeth of the rotor tooth-wheel 9.

In the example shown, the intermediate wheel 10 includes seventy-two teeth and the intermediate tooth-wheel 11 includes nine teeth.

One notices that because of problems of wear, here too, the number of teeth of the end wheel 12 does not correspond to a multiple of the number of teeth of the intermediate tooth-wheel 11.

Thus, by way of an example, this number of teeth of the end wheel is equal to seventy therefore, the reduction rate obtained is $$\frac{72}{10} \times \frac{70}{9} = 56$$

The advantage of such a construction can be seen in FIG. 2. By bringing the end wheel 12 against the mechanical stop 14A so that the recess between two successive teeth is located in the same alignment passing through the axis of this end wheel 12 and the axis of the rotor tooth-wheel 9 and having one tooth of said rotor tooth-wheel 9 coincide with this alignment, one is sure that when inserting the intermediate tooth-wheel 11 onto the end wheel 12, the intermediate wheel 10, integral with this intermediate tooth-wheel 11, is capable of cooperating, through its toothing, with the rotor tooth-wheel 9 that is, furthermore, in a balanced position.

By choosing, as number of teeth of the rotor tooth-wheel 9, the number of poles of the rotor 5 or a multiple of it, the above-described mounting proves indeed possible, irrespective of the balanced position into which this rotor 5 is brought through feeding one phase of the motor 1.

As already mentioned above, through such a mechanical setting, that from an industrial viewpoint is easy to be performed without predetermined angular orientation of the unit of intermediate wheel 10 and intermediate tooth-wheel 11, it is possible to very accurately know the reference position of the motor 1 and, hence, the phase that should be monitored through the method explained above.

Figure 8:
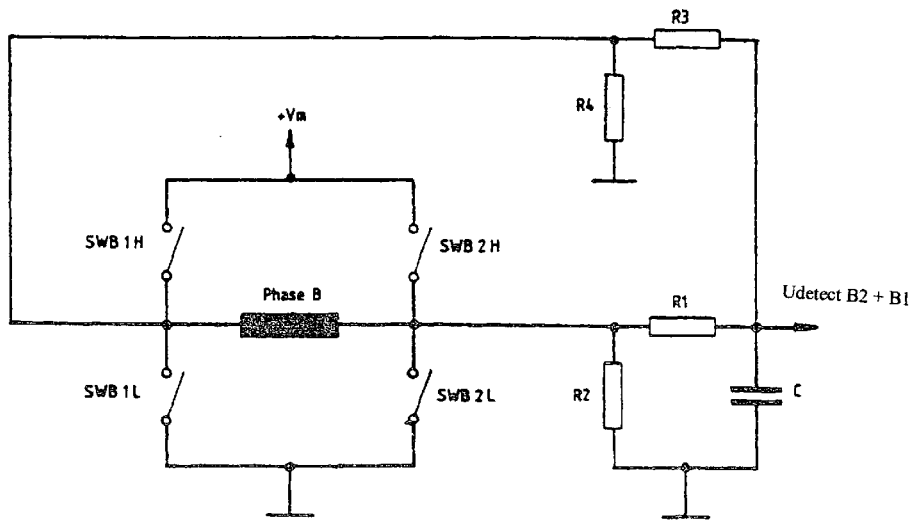
FIG. 8 is a schematic view showing an electronic mounting for the implementation of the method according to the invention.

Since it is within reach for the specialist to define an electronic mounting capable of ensuring the implementation of the setting method according to the invention, only one embodiment of it has been shown by way of an indication in FIG. 8 of the attached drawings.

We claim:

1. A method for setting an electric motor with respect to a reference position corresponding to a mechanical stop transmitted, through a gear system of a reduction gear, to an electric multi-phase motor with sequential power supply for step-by-step operation, the method comprising reading in a determined time window, during a sequence of non-feeding of at least one of the phases of the motor, a change in induced voltage $\Delta Ti$ in a phase that is not fed and comparing said change with a standard change $\Delta Ts$, in order to stop feeding of said motor on the sequence in the event of an offset.

2. The method according to claim 1, wherein said steps of reading and comparing is applied within a framework of a slow approach of the mechanical stop at a low power-supply frequency of the motor.

3. A method for setting an electric motor with respect to a reference position corresponding to a mechanical stop transmitted through a gear system of a reduction gear and an electric multi-phase motor with sequential power supply for step-by-step operation, the method comprising measuring in a determined time window, during a sequence of non-feeding of at least one of the phases of the motor, wherein an induced voltage Ti in the phase that is not fed and comparing an average value with a threshold value Ts, in order to stop the feeding of said motor on the sequence in progress if the average measured value is lower than said threshold value.

4. The method according to claim 3, further comprising measuring in a determined time window, during a sequence of non-feeding of at least one phase of the motor, an induced voltage Ti in the phase that is not fed, in order to compare its average value with a threshold value Ts and reading, in that same time window, a change $\Delta Ti$ in this induced voltage, in order to compare with a standard change $\Delta Ts$, in order to stop a feeding of said motor on the sequence in progress when the measured induced voltage Ti is lower than a threshold value Ts or the read change $\Delta Ti$ is different from a standard change $\Delta Ts$.

5. The method according to claim 3, wherein said step of measuring is applied within a framework of a quick approach of the mechanical stop at a high power supply frequency of the motor.

6. The method according to claim 3, wherein said induced voltage Ti is successively monitored in each one of the phases of the motor during the sequences of non-feeding of these phases.

7. The method according to claim 3, further comprising mechanically setting the gear system with respect to a mechanical stop inside the motor in a balanced position of the rotor, in order to determine a step of the motor to which corresponds the arrival of said gear system against this mechanical stop and to monitor the induced voltage Ti and/or the change in that induced voltage $\Delta Ti$ in the phase that is not fed of the motor at least during the sequence corresponding to that step.

8. Gear system, including a reduction gear, for implementing the method according to claim 7, comprising a rotor tooth-wheel engaging with an intermediate wheel axially mounted integral with an intermediate tooth-wheel engaging with an end wheel on which acts the mechanical stop, wherein a number of rotor teeth is chosen equal to the number of poles of the rotor magnet or to a multiple of it, wherein said intermediate wheel has a number of teeth corresponding to a multiple of the number of teeth of the intermediate tooth-wheel, while being different from a multiple of the number of teeth of the rotor tooth-wheel, wherein said end wheel has a number of teeth different from a multiple of the number of teeth of the intermediate tooth-wheel, and wherein said end wheel cooperates with the mechanical stop when, through an intermediate tooth-wheel and the intermediate wheel, the rotor is in a balanced position with respect to the feeding of one of the phases of the motor.

* * * * *